United States Patent [19]

Fukuda

[11] Patent Number: 4,829,389
[45] Date of Patent: May 9, 1989

[54] SURVEILLANCE VIDEO TAPE RECORDER

[75] Inventor: Motohiko Fukuda, Tokyo, Japan

[73] Assignee: Sony Corporation, Tokyo, Japan

[21] Appl. No.: 121,056

[22] Filed: Nov. 16, 1987

[30] Foreign Application Priority Data

Nov. 22, 1986 [JP] Japan .................. 61-279215

[51] Int. Cl.$^4$ .................. G11B 5/52; G11B 21/04
[52] U.S. Cl. .................. 360/73.06; 360/10.2; 360/78.02
[58] Field of Search .................. 360/73, 78, 10.2

[56]  References Cited

U.S. PATENT DOCUMENTS

| 4,510,533 | 4/1985 | Tokuyama | 360/10.2 |
| 4,535,367 | 8/1985 | Kanda | 360/10.2 |
| 4,568,986 | 2/1986 | Furuhata et al. | 360/10.2 |
| 4,581,658 | 4/1986 | Azuma et al. | 360/10.2 |

Primary Examiner—Robert S. Tupper
Attorney, Agent, or Firm—Alvin Sinderbrand

[57]  ABSTRACT

A surveillance video tape recorder has a pair of video heads secured on a rotary drum at different heights in the direction of the axis of the drum, a capstan drive circuit connected to a capstan motor for driving a magnetic tape at a substantially constant speed in a search mode, a head switching circuit connected to the pair of video heads for alternately deriving reproduced output signals therefrom, a tracking signal generating circuit for generating a tracking error signal from tracking pilot signals included in the reproduced output signals and from a reference pilot signal, a head switching pulse generating circuit for generating and supplying a head switching pulse to the head switching circuit and a gate circuit connected between the tracking signal generating circuit and the capstan drive circuit. This gate circuit selects a portion of the tracking error signal to be supplied to the capstan drive circuit in response to a sampling signal generated on the basis of the head switching pulse so that tracking control is effected in a manner to substantially hide noise bars in the upper and lower portions of the displayed picture obtained in the search mode.

14 Claims, 4 Drawing Sheets

SURVEILLANCE VIDEO TAPE RECORDER

BACKGROUND OF THE INVENTION

1. Field of the Invention

The present invention relates generally to video tape recorders and more particularly is directed to a surveillance or time-lapse video tape recorder.

2. Description of the Prior Art

Surveillance video tape recoders (SVTRs) are used for security or other purposes to provide a video recording of events occurring over extended periods of time. Although conventional magnetic tapes are designed to provide a maximum recording time of 3-4 hours, SVTRs are intended to record events over a much longer total elapsed time, for example, for as long as the 16 hours when a business may be closed. Such ability to record the events of 16 hours on a magnetic tape normally adapted to hold only 3-4 hours of recording, is achieved by time-lapse recording of still images.

In other words, instead of making a real time recording in which the time required for reproduction is equal to the elapsed time of events during recording, a time-lapse recording is made in which individual frames of a video signal corresponding to respective individual images are recorded at spaced time intervals in respective pairs of tracks on a magnetic tape by respective rotary magnetic heads. To save space on the tape, the tape is held stationary during the actual recording in each track, moved to a new position in anticipation of the recording of the next frame and thereafter held stationery until the recording of a subsequent frame has been completed. Upon reproduction, the tape may be driven at a constant speed in a continuous playback or search mode to locate a particular image of interest to the viewer, for example, an image showing the face of a suspected burglar, and then the single frame corresponding to that image may be repeatedly reproduced with the tape held stationary to provide a still image of good resolution. The foregoing system provides the necessary information for security purposes while saving significant amounts of tape.

However, the slant angle of the tracks in which signals are recorded while the tape is stationary or at rest is different from the angle of the path of the rotary magnetic heads as they scan across the tape while it is being moved in the continuous playback or search mode. Consequently, each path traced by a rotary magnetic head across the tape in the continuous playback or search mode will intersect two or more of the tracks in which the signals were recorded by heads having different azimuth angles. Such scanning by the heads along paths at an angle to the tracks causes noise bars to appear in the reproduced images in the continuous playback or search mode.

It has been proposed to control the tracking in the search mode so as to render the noise bars relatively inconspicuous. One system proposed for providing the requisite tracking includes a control (CTL) head to detect the position of a control signal recorded in a longitudinal track on the tape and, on the basis thereof, to correspondingly control a capstan motor driving the tape. Other systems for rendering the noise bar inconspicuous employ a video tape recorder having a four-head arrangement, or use a guard-band system in which guard bands are provided between the successive tracks and signals are recorded and reproduced by two heads having the same azimuth angle. However, the four-head arrangement is relatively complicated and expensive, while the guard-band system is not compatible with present standard video tape recorders. Moreover, the video tape recorder using the CTL tracking system requires a special CTL head and also requires careful and time consuming adjustment thereof during the manufacturing of the video tape recorder in order to achieve the necessary tracking control for rendering the noise bars inconspicuous.

OBJECTS AND SUMMARY OF THE INVENTION

Accordingly, it is an object of the present invention to provide a surveillance video tape recorder which avoids the above-described difficulties of the prior art.

It is another object of the present invention to provide a surveillance video tape recorder from which a reproduced image with inconspicuous noise bars is obtained in a continuous playback or search mode.

It is yet another object of the present invention to provide a surveillance video tape recorder, as aforesaid, having a simplified head arrangement and which is compatible with standard video tape recorders.

It is a further object of the present invention to provide a surveillance video tape recorder which requires neither a CTL head nor individual tracking control adjustment at the time of manufacture.

In accordance with an aspect of the present invention, a surveillance video tape recorder for reproducing signals which are recorded on a magnetic tape in successive tracks and include respective tracking pilot signals, comprises a rotary guide drum about which the tape is wrapped and diametrically opposed rotary first and second video heads mounted on the drum at different heights in the direction of a central axis of the drum for scanning the tracks and alternately reproducing the signals therefrom; capstan drive means including a capstan motor for driving the tape at a substantially constant speed in a search mode; head switching pulse generating means connected to the rotary guide drum for generating a head switching pulse in synchronism with the rotary movements of the video heads; head switching means connected to the first and second video heads and responsive to the head switching pulse for deriving, as an output signal, the signals alternately reproduced by the video heads; means for providing a reference pilot signal; tracking signal generating means for generating a tracking error signal in response to the reference pilot signal and the tracking pilot signals included in the output signal from the head switching means; sampling signal generating means for generating a sampling signal in response to the head switching pulse; and gating means connected between said tracking signal generating means and said capstan drive means for selectively supplying the tracking error signal to the capstan drive means in response to the sampling signal.

In accordance with a further aspect of the present invention, in a surveillance video tape recorder of the type including a guide drum about which the tape is wrapped at a predetermined angle with respect to a central axis of the drum and on which diametrically opposed rotary first and second video heads are mounted at different heights in the direction of the central axis for alternately scanning across the tape to record information signals in successive slant tracks, the tape being held at rest in a recording mode of the recorder during each scanning of a video head across the tape to record in a respective track and being moved a predetermined distance after each pair of scannings of the tape by the first and second video heads, respectively, the video heads further recording selected ones of a plurality of tracking pilot signals in respective ones of the tracks for identifying the same: a system for reproducing the recorded signals in a search mode of the recorder comprises capstan drive means including a capstan motor for driving the tape at a substantially constant speed in said search mode; the first and second video heads scanning across the tape in the search mode along paths which, due to the driving of the tape at the substantially constant speed, intercept a plurality of the slant tracks; head switching pulse generating means connected to the rotary video heads for generating a head switching pulse; head switching means connected to the first and second video heads and responsive to the head switching pulse for deriving, as an output signal, the signals alternately reproduced by the video heads; means for providing a reference pilot signal corresponding to a selected one of the plurality of tracking pilot signals; tracking signal generating means for generating a tracking error signal in response to the reference pilot signal and the tracking pilot signals included in the output signal; sampling signal generating means for generating a sampling signal in response to the head switching pulse; and gating means connected between the tracking signal generating means and the capstan drive means for selectively supplying the tracking error signal to the capstan drive means in response to the sampling signal so that each of the first and second video heads is aligned with either a first or a last portion of a slant track upon scanning along each path across said tape, whereby a video image is provided with substantially hidden or inconspicuous noise bars at the top and bottom thereof.

The above, and other objects, features and advantages of the present invention, will be apparent in the following detailed description of a preferred embodiment to be read in connection with the accompanying drawings in which the same reference numerals identify like elements and parts in the several views.

DETAILED DESCRIPTION OF A PREFERRED EMBODIMENT

Figure 1:
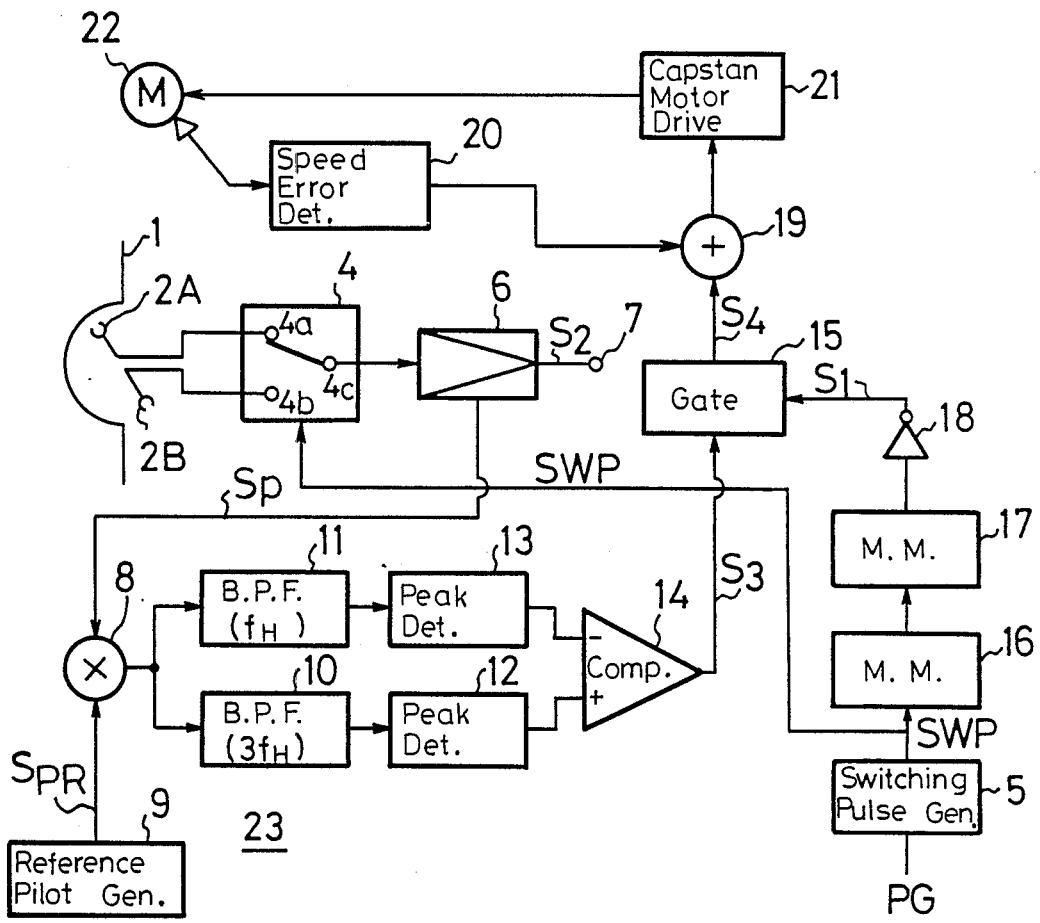
FIG. 1 is a block diagram showing a circuit arrangement of a surveillance video tape recorder according to an embodiment of the present invention.
Figure 2:
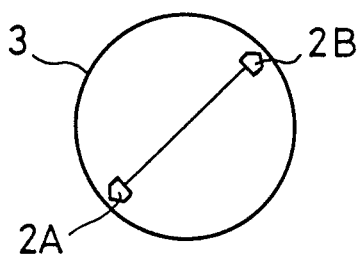
FIG. 2 is a top view of a rotary head assembly used in the embodiment of the present invention shown in FIG. 1.
Figure 3:
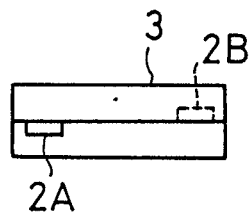
FIG. 3 is a side elevational view of the head assembly of FIG. 2.

Referring to the drawings in detail, and initially to FIGS. 1-3 thereof, it will be seen that a surveillance video tape recorder (SVTR) according to the present invention records and reproduces signals on a magnetic tape 1 by means of two diametrically opposed, rotary magnetic heads 2A and 2B. It is conventional in time-lapse recording to record only a video signal and not to record any associated audio signal, and, consequently, magnetic heads 2A and 2B are hereinafter referred to as video heads. As seen in FIG. 2, a rotary tape guide drum 3 is associated with video heads 2A and 2B which are mounted thereon with an angular distance of 180° therebetween. Video heads 2A and 2B have different azimuth angles, that is, the angles of their respective magnetic gaps relative to the scanning direction are different. Magnetic tape 1 is wrapped obliquely around the peripheral surface of rotary drum 3 with a tape wrap angle of substantially 180°, as shown in FIG. 1, and is adapted to be transported or driven in the longitudinal direction of the tape by means of a capstan (not shown). Conventionally, video heads 2A and 2B are rotated through a complete revolution, that is, through 360°, during one frame of the video signal. Video head 2A scans magnetic tape 1 in a recording mode of the VTR during an odd-numbered field, and video head 2B scans tape 1 during an even-numbered field.

Since, in accordance with conventional practice, the SVTR embodying this invention records a time-lapse image on the magnetic tape 1, that is, the tape is at rest during the scanning of the tape by the head 2A and then by the head 2B for recording a respective frame of the video signal in two adjacent tracks, it is necessary that the heads 2A and 2B be spaced apart in the direction of the central axis of the drum 3, as shown on FIG. 3, for example, by a distance of 20.5 μm corresponding to the track width. By reason of such spacing of the video heads 2A and 2B, the latter will scan across the tape in adjacent paths, even though the tape is at rest, so as to record respective fields of a frame of video signals in corresponding slant tracks, for example, the tracks $TA_1$ and $TB_1$ on FIG. 5. After the recording of a frame of the video signal in the time-lapse recording mode, the tape 1 is advanced a distance equal to the width of two slant tracks and, subsequently, while the tape is again at rest, two fields making up a frame of the video signal are recorded by heads 2A and 2B, for example, in the slant tracks $TA_2$ and $TB_2$, respectively, on FIG. 5. The time-lapse recording of video frames that are spaced in time continues with intermittent advancement of the tape.

Figure 5:
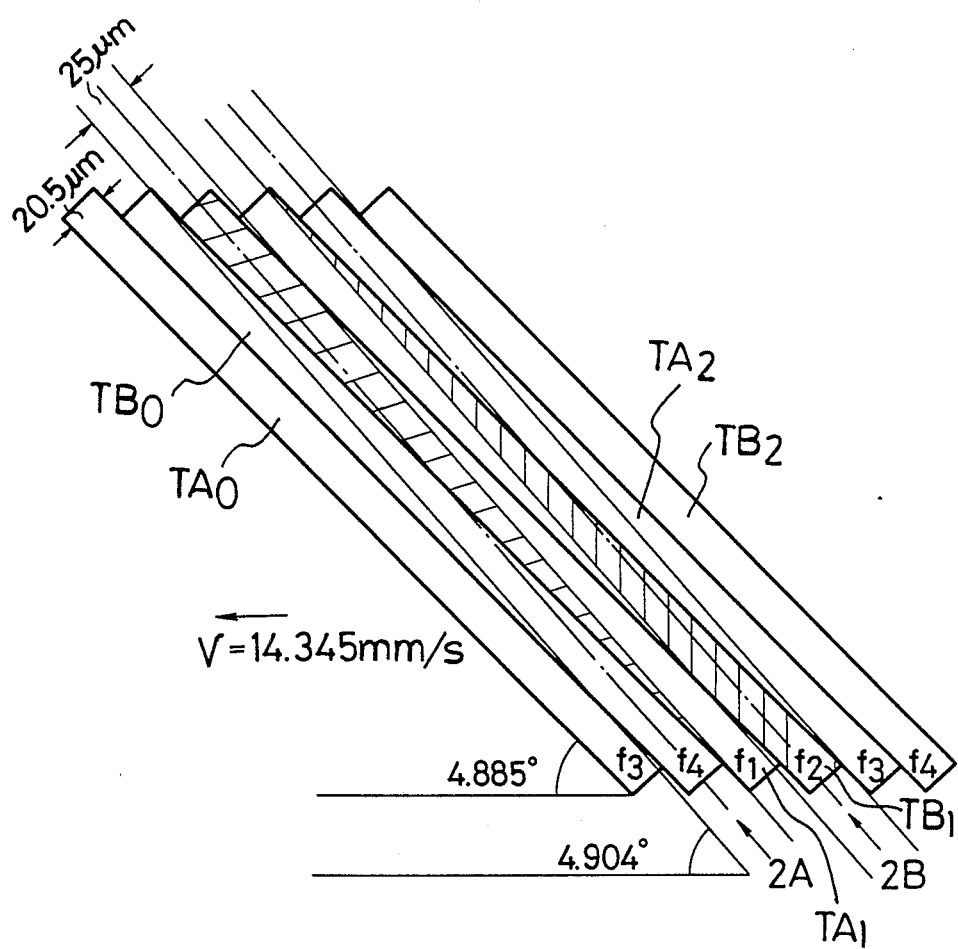
FIG. 5 is a schematic diagram showing a track pattern formed on the tape by the rotary heads when the tape is transported in the forward direction.

In the SVTR to which the present invention is applied, tracking pilot signals of four different frequencies $f_1$, $f_2$, $f_3$ and $f_4$ are cyclically repeated and are successively recorded with the fields of video in respective ones of the tracks on magnetic tape 1 for use in tracking servo-control during playback. As illustrated in FIG. 5, the first and third tracking pilot signals with frequencies $f_1$ and $f_3$ are recorded by video head 2A in the two successive tracks $TA_1$ and $TA_3$ recorded thereby. Similarly, the second and fourth tracking pilot signals with frequencies $f_2$ and $f_4$ are recorded by video head 2B in two successive tracks recorded thereby, for example, in tracks $TB_1$ and $TB_2$. Thus, the tracking pilot signals are cyclically recorded in a repeating pattern so as to identify each of the tracks in a group of four and further for use in positioning either video head 2A or 2B during the tracing of a path across magnetic tape 1 in a reproducing mode of the apparatus, as hereinafter described.

During the recording of each track, the respective pilot signal may be superimposed, for example, frequency-multiplexed, on a video signal, which is a composite signal formed of a low band converted chrominance signal and an FM modulated luminance signal, and is then recorded with the video signal in the respective track. The frequencies $f_1$ to $f_4$ of the tracking pilot signals are selected to be in a band below the low band converted chrominance signal. For example, in the preferred embodiment, these frequencies $f_1$, $f_2$, $f_3$ and $f_4$ are advantageously selected to be equal to 102.544 kHz, 118.951 kHz, 165.210 kHz and 148.689 kHz, respectively. These frequencies are seen to be predetermined multiples of the horizontal line frequency $f_H$ of the video signal. Thus, frequency $f_1$ is about 6.5 $f_H$, frequency $f_2$ is about 7.5 $f_H$, frequency $f_3$ is about 10.5 $f_H$ and frequency $f_4$ is about 9.5 $f_H$. Consequently, the difference between frequencies $f_2$ and $f_1$ is $f_H$, while the difference between frequencies $f_4$ and $f_1$ is 3 $f_H$. Similarly, the difference between frequencies $f_3$ and $f_4$ is $f_H$ while the difference between frequencies $f_3$ and $f_2$ is 3.0 $f_H$.

With magnetic tape 1 at rest during time-lapse recording, each of the record tracks, for example, the tracks $TA_0$, $TB_0$, $TA_1$, $TB_1$, $TA_2$, and $TB_2$ on FIG. 5, is at a slant angle in respect to the longitudinal direction of the tape equal to the angle between such longitudinal direction and a plane normal to the central axis of the rotary drum 3. In the illustrated embodiment, such slant angle of the tracks is 4.885°. If the tape is at rest during reproducing, the path along which each of the heads 2A and 2B scans the tape similarly has a slant angle of 4.885 so that, by centering the head 2A or 2B relative to an end of a selected one of the corresponding tracks $TA_0$, $TA_1$ and $TA_2$ or $TB_0$, $TB_1$ and $TB_2$, correct tracking of the head along the entire selected track can be assured.

As shown on FIG. 5, although the width of each track is 20.5 μm, the effective width of each of the heads 2A and 2B is 25.0 μm. Therefore, the successive tracks are recorded in slightly overlapping relation. Furthermore, during reproducing, even if, for example, video head 2A is centered over track $TA_2$, it will reproduce a primary signal from track $TA_2$, including the tracking pilot signal of the frequency $f_3$, and head 2A will also reproduce small amounts of the signals from tracks $TB_1$ and $TB_2$, that is, signals including components with the tracking pilot frequencies $f_2$ and $f_4$, respectively. If video head 2A is centered with respect to the track $TA_2$, the tracking pilot component having a frequency $f_3$ will have the highest reproduced level while the tracking pilot components having frequencies $f_2$ and $f_4$ will have lower reproduced levels equal to each other. Correspondingly as video head 2A shifts from the center of track $TA_2$, the reproduced levels of the tracking pilot components with frequencies $f_2$ and $f_4$ will become unequal to each other. These reproduced levels may be easily isolated in accordance with known techniques by generating components with the beat frequencies $f_3-f_2$ and $f_3-f_4$ by multiplying the reproduced tracking pilot signal by a reference pilot signal having the frequency $f_3$. These two beat components can be conventionally used in the apparatus according to the present invention to detect whether rotary head 2A is advanced or delayed relative to the center of the recorded track $TA_2$ on magnetic tape 1, and to correct the position at which the tape is held at rest for accurate scanning of the heads 2A and 2B along the selected record tracks.

Figure 6:
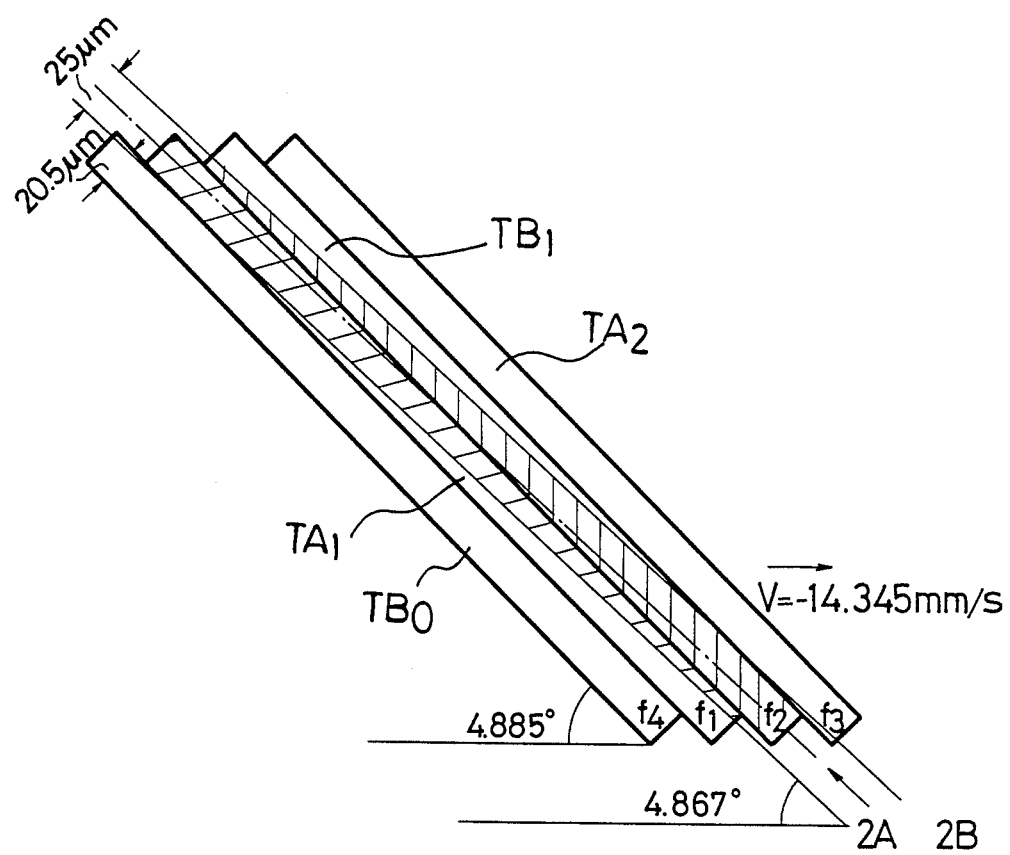
FIG. 6 is a similar schematic diagram, but showing a track pattern formed on the tape by the rotary heads when the tape is transported in the reverse direction.

However, if the tape is moving either in the forward direction (FIG. 5) or in the reverse direction (FIG. 6) as the heads 2A and 2B scan across the tape 1 during reproducing, as in the search mode of the SVTR, the slant angle of the path followed by each head is different from the slant angle of each track recorded with the tape at rest. For example, if the speed of movement of the tape in the forward direction is 14.345 mm/sec., as in FIG. 5, the slant angle of each head path is 4.904° as compared with the track slant angle of 4.885°. On the other hand, if the tape is moved at the same speed of 14.345 mm/sec. but in the reverse direction, the slant angle of each head path is 4.867°, as shown on FIG. 6. In either case, each of the video heads 2A and 2B will partly scan a track recorded by a head having the same azimuth angle, as indicated by the hatching on FIGS. 5 and 6, and will partly scan one or more of the adjacent tracks recorded by a head having a different azimuth angle.

As is well known, when the video head 2A or 2B scans a track which was recorded by a head having the same azimuth angle, the signals recorded in the scanned track are strongly reproduced. However, when the head 2A or 2B scans a track which was recorded by a head having a different azimuth angle, the level of the reproduce signal is substantially reduced by the well known azimuth loss phenomenon. Therefore, in the search mode of the SVTR, when the heads 2A and 2B alternately scan paths across the tape 1 that are angled in respect to the tracks in which signals were recorded with the tape at rest, it is inevitable that the alternately produced outputs of the video heads 2A and 2B will contain noise at least at certain times, with the result that so-called noise bars will appear in the resulting displayed image.

Generally, in accordance with the present invention, the SVTR is provided with a tracking control system effective in the search mode and by which such noise bars are substantially hidden in the upper and lower portions of the displayed images so as to be inconspicuous and present minimum interference with observation of the images displayed in succession in the search mode. More particularly, such tracking control system effective in the search mode aligns the path of each of the video heads 2A and 2B with a first or a last portion of a respective track which was recorded by a video head having the same azimuth angle.

The tracking control system for the search mode will now be described further with reference to FIG. 1 in which the video and tracking pilot signals reproduced by video heads 2A and 2B are supplied to fixed contacts 4a and 4b, respectively, of a head change-over switch 4. Head change-over switch 4 is operated by a head switching pulse SWP synchronized with the rotating phase of video heads 2A and 2B so that a movable contact 4c engages fixed contact 4a during scanning of video head 2A across the tape and movable contact 4c is changed-over to engage fixed contact 4b during scanning of video head 2B across the tape. More particularly, a conventional PG pulse generator (not shown) associated with the rotary drum 3 produces a PG pulse in synchronism with each complete revolution of the drum and video heads. A switching pulse generator 5 receives the PG pulse and produces the head switching pulse SWP (FIG. 4A) in synchronism therewith, that is, with a period equal to the frame period and with a rectangular waveform and a duty cycle of 50%.

The output signal from the movable contact 4c of the head change-over switch 4 is applied to a playback amplifier 6, which produces a playback RF signal S2 (FIG. 4C) at an output terminal 7. RF signal S2 is then supplied to a conventional processing/display section of the SVTR (not shown) to produce a displayed image on a monitor or television receiver in accordance with known techniques.

The playback amplifier 6 extracts, as by suitable filtering, any of the tracking pilot signals having the frequencies $f_1$, $f_2$, $f_3$ and $f_4$ that are included in the reproduced output signal from switching circuit 4, and the resulting reproduced pilot signal $S_p$ is supplied from playback amplifier 6 to a first input of a multiplier 8 which is advantageously in the form of a balanced modulator. A second input of the multiplier 8 receives from a generator 9 a reference pilot signal $S_{pr}$ which has the same frequency as the tracking pilot signal recorded in the track on the tape then intended to be scanned by the head 2A or 2B. For example, during a field period in which the head 2A is intended to scan the track $T_{A1}$ having recorded therein a tracking pilot signal with the frequency $f_1$, the reference pilot signal generator 9 will supply to the multiplying circuit 8 a reference pilot signal $S_{pr}$ with the frequency $f_1$. Similarly, during the next field period in which it is intended that the head 2B should scan the track $TB_1$ in which a tracking pilot signal with the frequency $f_2$ is recorded, the reference pilot signal $S_{pr}$ from generator 9 is provided with the frequency $f_2$. Accordingly, it will be appreciated that the reference pilot signal $S_{pr}$ from generator 9 is selectively provided with one of the frequencies $f_1$, $f_2$, $f_3$ and $f_4$ depending upon the frequency of the tracking pilot signal recorded in the record track on the tape then intended to be scanned by one of the rotary heads 2A and 2B.

As earlier noted, when the rotary magnetic head 2A or 2B is centered in respect to the track intended to be scanned thereby, the reproduced pilot signal $S_p$ contains three tracking pilot components respectively having the frequency of the tracking pilot signal recorded in such track intended to be scanned and the frequencies of the tracking pilot signals recorded in the adjacent tracks at opposite sides of the track intended to be scanned. Thus, for example, if it is intended that the head 2A should scan the track $TA_1$ containing the tracking pilot signal with a frequency $f_1$, the reproduced pilot signal $S_p$ will contain components with the frequencies $f_4$, $f_1$ and $f_2$, respectively. When the rotary magnetic head 2A is centered in respect to the track $TA_1$, the level of the component of the reproduced pilot signal with the frequency $f_1$ is the highest and the reproduced levels of the components with the frequencies $f_4$ and $f_2$ are equal to each other.

In accordance with known techniques, the multiplier 8 produces an output which, in the above example, has components with the frequencies $f_4 \pm f_1$ and $f_2 \pm f_1$. In order to obtain the two specific beat frequency components $f_4 - f_1$ which equals $3f_H$ and $f_2 - f_1$ which equals $f_H$, the output from multiplier 8 is supplied to first and second band pass filters 10 and 11 connected in parallel and which have center frequencies of $3f_H$ and $f_H$, respectively. The outputs from the band pass filters 10 and 11 are supplied to peak detectors 12 and 13, respectively, which detect the envelopes of the components signals passed by filters 10 and 11. The detected signals from peak detectors 12 and 13 are supplied to a non-inverting input and an inverting input, respectively, of a comparator 14 which provides a corresponding compared output $S_3$. The multiplier 8, band pass filters 10 and 11, peak detectors 12 and 13 and comparator 14 constitute a so-called automatic track following (ATF) circuit 23, and the output signal $S_3$ from comparator 14 constitutes an ATF error signal.

It will be appreciated that, if video head 2A is in a so-called standard position in which it precisely scans the track $TA_1$ having the tracking pilot signal with the frequency $f_1$ recorded therein, for example, in a reproducing mode with the tape at rest so as to provide a still motion image corresponding to the frame of the video signal recorded in tracks $TA_1$ and $TB_1$, the levels of the beat frequency components $f_4 - f_1$ and $f_2 - f_1$ will be equal to each other so that the ATF error signal $S_3$ will be 0. However, if, with the tape at rest, the rotary heads 2A and 2B are advanced relative to the standard position on the magnetic tape at which heads 2A and 2B are centered in respect to tracks $TA_1$ and $TB_1$ when successively scanning such tracks, the beat component having the frequency $f_H$, that is $f_2 - f_1$, which is the adjacent advanced beat from the tracking pilot signal recorded in the track TBl and having the frequency $f_2$ will be increased, while the adjacent delayed beat having the frequency $3f_H$, that is, $f_4 - f_1$, from the tracking pilot signal having the frequency $f_4$ recorded in the track $TB_0$, will be decreased. Correspondingly, if the video heads 2A and 2B are delayed relative to the described standard positions in respect to the magnetic tape, the output component from multiplier 8 with the frequency $3f_H$, that is the adjacent delayed beat, is increased, and the output component with the frequency $f_H$, that is, the adjacent advanced beat is decreased.

Of course, as earlier noted, during reproducing in the search mode, the paths along which the heads 2A and 2B alternately scan across the tape are necessarily angularly displaced in respect to the slant tracks in which the signals are recorded. Therefore, the continuous movement of the tape cannot be reasonably controlled so as to ensure that either the head 2A or the head 2B will remain centered while scanning along the entire length of a track, for example, the track $TA_1$ or $TB_1$, respectively, which was recorded by a head having the same azimuth angle. Therefore, in accordance with the present invention, in the search mode, the movement of the tape is controlled so that, for example, in the case of the tape moving in the forward direction, as shown on FIG. 5, the initial portion of the path followed by the head 2A in the first field of a frame is substantially centered in respect the track $TB_0$ in advance of the track $TA_1$ intended to be scanned, with the path of the head 2A, coming increasingly into alignment with the track $TA_1$ so that, at the concluding portion of such path, the head 2A is substantially centered in respect to the track $TA_1$ being scanned. Continuing with the desired tracking scheme shown on FIG. 5 for the search mode conducted with the tape being driven in the forward direction, in the second field period, the head 2B is centered, at the beginning of its path across the tape, in respect to the track $TB_1$ recorded by a head with the same azimuth angle, with the path of the head 2B deviating from the track $TB_1$ so as to increasingly extend over the adjacent track $TA_2$. By reason of the foregoing desired tracking scheme in the search mode, the RF output signal $S_2$ derived at terminal 7 is shown on FIG. 4C to have a minimum magnitude or level at the beginning of the first field of a frame, as when the head 2A is approximately centered in respect to the track $TB_0$ which was recorded with the video head 2B. As the head 2A moves along its path and comes into increasing alignment with the track $TA_1$, the magnitude of the reproduced RF signal $S_2$ is increased until a maximum is reached when video head 2A extends across the entire width of the track $TA_1$. Since the width of the head 2A is slightly greater than the width of each record track, as previously indicated, the head 2A will extend completely across the width of the track $TA_1$ along an end portion of the latter so that the maximum magnitude of the signal $S_2$ will be maintained for a concluding portion of the first field of the frame. For the same reason, at the initial portion of the second field of the frame, the head 2B will extend completely across the width of the track $TB_1$ along a part of the length of the latter so that the maximum magnitude of the signal $S_2$ will be sustained for the initial portion of the second field. Thereafter, as the path of the head 2B deviates from the track $TB_1$ and extends increasingly over the adjacent track $TA_2$ recorded with a head having a different azimuth angle, the magnitude of the reproduced signal $S_2$ is progressively reduced to a minimum at the conclusion of the frame. The foregoing sequence of increasing and then decreasing magnitudes of the reproduced signal $S_2$ is repeated for each of the successive frames in the search mode when the desired tracking scheme is maintained.

Figures 4A, 4B, 4C, 4D, 4E:
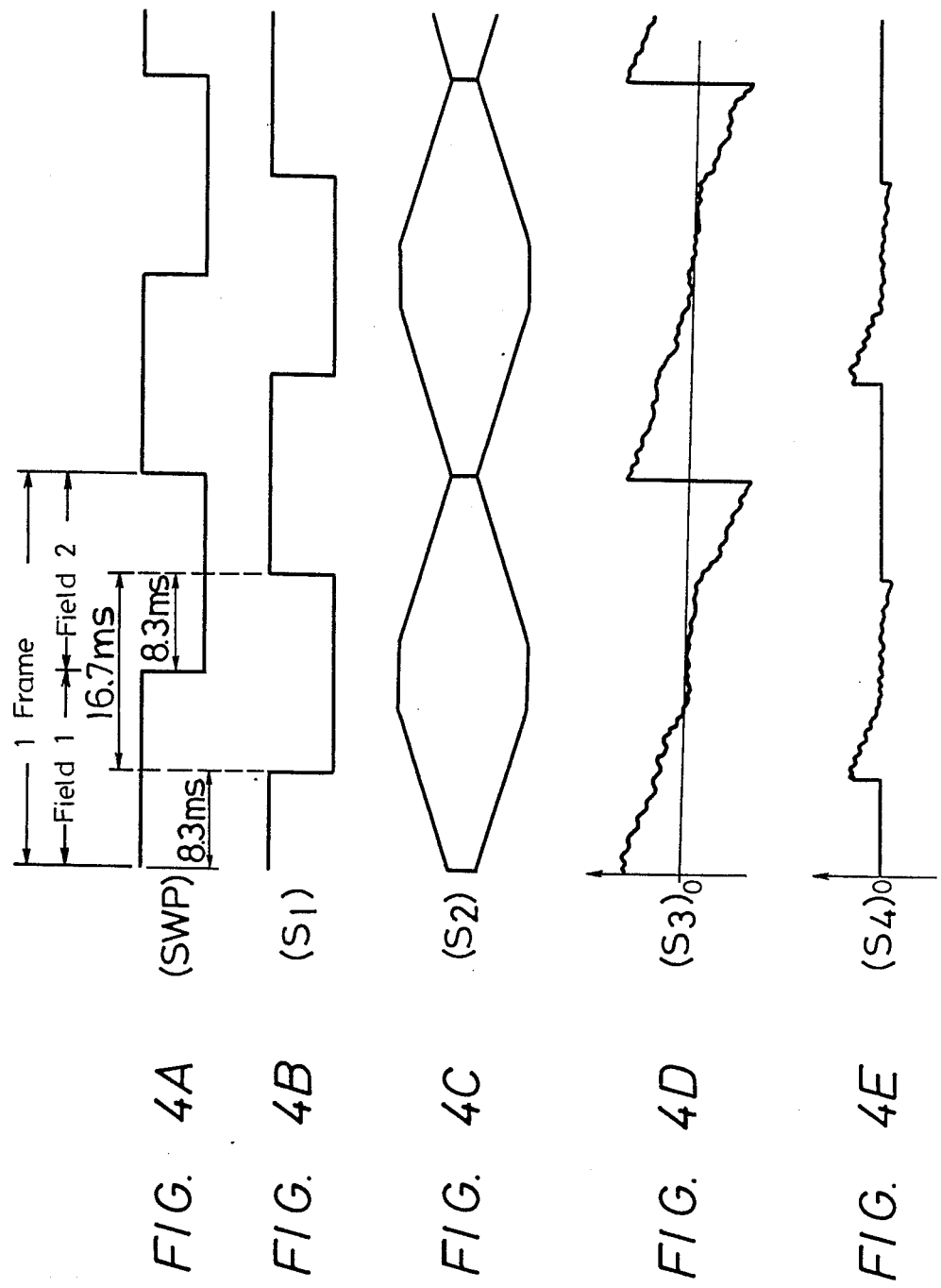
FIGS. 4A to 4E are signal waveform diagrams to which reference will be made in explaining the operation of the surveillance video tape recorder shown in FIG. 1.

With the variation of the magnitude of the reproduced RF signal $S_2$ shown on FIG. 4C, a noise bar is likely to be developed at the upper portion of the CRT screen during the first field of a frame and, similarly, a noise bar is likely to be produced at the lower portion of the screen during the second field of the same frame. However, the strong signal $S_2$ produced during the later half of the first field causes the resulting image to cover-up or hide the noise bar that would otherwise appear at the lower portion of the screen and, similarly, the strong signal $S_2$ appearing during the initial half of the second field of each frame serves to cover-up or hide the noise bar that would otherwise appear at the upper portion of the screen.

By reason of the aforesaid hiding of the noise bars at the upper and lower portions of the screen or image, such noise bars are rendered inconspicuous with the result that the successive images displayed during reproduction in the search mod can be comfortably observed. When the tracking scheme illustrated on FIG. 5 is maintained during reproduction in the search mode, the ATF error signal $S_3$ from comparator 14 has a waveform substantially as illustrated on FIG. 4D. More specifically, when the video head 2A traces the desired path illustrated in FIG. 5 for the case in which the search mode is employed with the tape being driven in the forward direction, the ATF error signal $S_3$ has a maximum initial value consistent with the fact that the head 2A is completely off the track $TA_1$ in the direction toward the adjacent track $TB_0$ at the beginning of the first field, and the value of the ATF error signal $S_3$ gradually declines toward 0 as the end of the first field is neared as a consequence of the fact that the head 2A comes into alignment with the track $TA_1$. Similarly, in the case of the head 2B following the desired path, at the initial portion of the second field, the ATF error signal $S_3$ has a value of approximately 0 as a consequence of the fact that the head 2B then substantially scans the entire width of the track $TB_1$. However, as the head 2B moves gradually off the track $TB_1$ in the direction toward the adjacent track $TA_2$, the ATF error signal $S_3$ acquires a gradually increasing negative value which becomes a maximum at the end of the frame.

It will be appreciated that, if the video heads 2A and 2B deviate from their desired paths, the relative magnitudes of the advanced and delayed beat components having the frequencies $f_H$ and $3f_H$ will be varied so that the waveform of the ATF error signal $S_3$ derived from the output of comparator 14 will be shifted up or down from the position shown on FIG. 4D. Thus, the ATF error signal $S_3$ from comparator 14 may be used to generate a tracking error signal indicative of deviations of the actual paths of the heads 2A and 2B from the desired paths shown on FIG. 5.

In order to generate a usable tracking error signal from the ATF error signal $S_3$, the SVTR in accordance with the present invention is further shown on FIG. 1 to have a gating circuit 15 which receives the ATF error signal $S_3$ from comparator 14, and which is controlled by a sampling or gating signal $S_1$ shown on FIG. 4B. The gating circuit 15 is operative to pass therethrough the ATF error signal $S_3$ as a tracking error signal $S_4$ (FIG. 4E) during those intervals when the sampling or gating signal $S_1$ is at a low level. At other times, that is, when the sampling or gating signal $S_1$ is at a high level, gating circuit 15 is effective to maintain the tracking error signal $S_4$ at 0 or some other predetermined level.

As shown on FIG. 4B, the sampling or gating signal $S_1$ is formed so that a low level interval thereof during which gating circuit 15 is opened to pass the ATF error signal $S_3$ as a tracking error signal $S_4$ occurs within each frame during the period in which the heads 2A and 2B, when in their standard positions for achieving the desired tracking relationships, are most nearly centered in respect to the tracks, for example, the tracks $TA_1$ and $TB_1$ on FIG. 5, that were recorded by heads of the same azimuth angles. In other words, and as shown on FIG. 4B, the sampling signal $S_1$ is formed to be at a low level for an interval within each frame that extends from approximately the middle of the first field to approximately the middle of the second field of the respective frame. By reason of the foregoing, it is made certain that the tracking error signal $S_4$ used for establishing correct tracking by the heads 2A and 2B, as hereinafter described, is derived from only that portion of the ATF error signal $S_3$ which accurately reflects the deviation, if any, of the actual paths of the heads 2A and 2B from the desired paths. Thus, in the example illustrated on FIG. 5, the tracking error signal $S_4$ is derived only in respect to that portion of the path of the head 2A which, in its standard position, substantially intersects the track $TA_1$. By reason of the foregoing, even when the path of head 2A deviates substantially from the desired path, only the tracking pilot signals having the frequencies $f_1$, $f_2$ and $f_4$ are included in the reproduced pilot signal $S_p$. Similarly, the tracking error signal $S_4$ is derived only in respect to that portion of the path of the head 2B which, in the standard position of the latter, substantially intersects the track $TB_1$. Once again, the reproduced pilot signal $S_p$ can only include the tracking pilot signals having the frequencies $f_2$, $f_1$ and $f_3$, respectively, even when the path of the head 2B deviates substantially from the desired or standard path.

The foregoing condition achieved in accordance with the present invention is to be distinguished from the situation encountered, for example, at the beginning of the path of the head 2A. At that time, if the path of the head 2A deviated from the desired path thereof in the direction of the tape travel on FIG. 5, the reproduced output from the head 2A would include a tracking pilot component of the frequency $f_3$ from the track $TA_0$ and a tracking pilot component of the frequency $f_4$ from the track $TB_0$ which could lead to an erroneous error indication in the ATF error signal $S_3$. Such erroneous error indications are avoided in accordance with this invention.

Referring again to FIG. 1, it will be seen that the sampling or gating signal $S_1$ is obtained in the SVTR embodying this invention by supplying the head switching pulse SWP (FIG. 4A) from the switching pulse generator 5 to a monostable multi-vibrator 16 having a predetermined delay or output pulse time, for example, of 8.3 ms, and by supplying the output of the monostable multi-vibrator 16 to a second monostable multi-vibrator 17 having a second predetermined delay or output pulse time, for example, of 16.7 ms, whereupon the output of the monostable multi-vibrator 17 is supplied through an inverter 18 as the sampling or gating signal $S_1$ for gate circuit 15.

The ATF error signal $S_4$ passed through gate circuit 15 in response to the sampling signal $S_1$ is supplied to one input of an adder 19 which, at another input thereof, receives a speed error signal from a capstan speed error detecting circuit 20. The output signal from the adder 19, that is, the result of the tracking error signal $S_4$ and the capstan speed error signal from the circuit 20, is applied to a capstan motor drive circuit 21 by which the speed and phase of a motor 22 for driving the tape capstan (not shown) are suitably controlled.

In a standard video tape recorder, of the type having the so-called four frequency tracking system, that is, a tracking system based upon the recording in the successive tracks of tracking pilot signals having the frequencies $f_1$, $f_2$, $f_3$ and $f_4$ in a repeating cyclic order, the tape is driven at a standard speed during both recording and reproducing operations. In such case, the capstan motor is controlled during reproducing or playback, so that the components $f_H$ and $3f_H$ remain equal to each other during the scanning of each of the rotary heads along the entire length of the respective record track, that is, so that each rotary magnetic head remains centered relative to the respective record track on the tape while moving across the latter. As distinguished from the foregoing, since the present invention is applied to the search mode of a surveillance video tape recorder or SVTR employing a time-lapse mode of recording, the tracking control causes the paths of the rotary magnetic heads 2A and 2B, which are angularly displaced in respect to the slant tracks, to be substantially centered, at the end of the path of the head 2A and at the beginning of the path of the head 2B, in respect to slant tracks that were recorded by heads having the same azimuth angles as the heads 2A and 2B, respectively.

More specifically, in the case of the search mode in which the tape is continuously driven in the forward direction, as shown on FIG. 5, the capstan motor 22 is controlled so that, at the end of the path of the rotary magnetic head 2A, such path is substantially centered in respect to the track $TA_1$ that was recorded by a head having the same azimuth angle as the head 2A, while the path of the head 2B is substantially centered, at the beginning thereof, in respect to the track $TB_1$ that was recorded by a head having the same azimuth angle as the head 2B. Similarly, in the case of reproducing in the search mode with the tape being driven in the reverse direction, as shown on FIG. 6, the capstan motor 22 is controlled so that the path of the head 2A, at the end thereof, is substantially centered in respect to the track $TA_1$ which was recorded by a head having the same azimuth angle as the head 2A, while the path of the head 2B (which may coincide with the path of the head 2A due to the reverse movement of the tape) is substantially centered, at the beginning of the path of the head 2B in respect to the track $TB_1$ which was recorded by a head having the same azimuth angle as the head 2B. By the way, it will be appreciated that, although the heads 2A and 2B are spaced apart in the direction of the axis of the guide drum 3 by a distance equal to the width of a record track on the tape, the paths traced on the tape by the heads 2A and 2B are either two track widths apart when the tape is driven continuously in the forward direction as on FIG. 5 or are made to coincide when the tape is driven in the reverse direction, as on FIG. 6.

When the capstan motor 22 is controlled during reproducing in the search mode so that the rotary magnetic heads 2A and 2B trace the record tracks on the magnetic tape in the manner described above with reference to FIGS. 5 and 6, the reproduced RF signal $S_2$ delivered to the output terminal 7 will have the waveform of FIG. 4C and, as a result of such tracking control, noise bars at the upper and lower portions of the displayed image or picture will be substantially hidden or made inconspicuous. Further, the central portion of the picture will be free of noise bars. Thus, the quality of the picture reproduced in the continuous or search mode is very substantially improved. Further, by producing the tracking error signal $S_4$ from only that portion of the ATF error signal $S_3$ occurring during the concluding portion of the first field and the initial portion of the second field of each frame, the resulting tracking error signal is capable of reliably controlling the capstan motor so as to obtain the desired tracking relationship by which reproducing in the search mode can be achieved while avoiding conspicuous noise bars in the reproduced picture. Furthermore, the SVTR embodying this invention has a simplified arrangement of its rotary heads, that is, only two diametrically opposed heads, and is compatible with other standard video tape recorders. Moreover, a CTL (control) head and precise adjustment of such head and of the tracking control during manufacture are not necessary in the SVTR according to the present invention.

Although a preferred embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A surveillance video tape recorder for reproducing signals which include respective tracking pilot signals and which are recorded in successive tracks on a magnetic tape, comprising:

rotary head means including a guide drum about which the tape is wrapped and diametrically opposed first and second video heads mounted on the drum at different heights in the direction of a central axis of said drum for scanning the tracks and alternately reproducing said signals therefrom capstan drive means including a capstan motor for driving the tape at a substantially constant speed in a search mode;

head switching pulse generating means connected to the rotary head means for generating a head switching pulse;

head switching means connected to the first and second video heads and responsive to said head switching pulse for deriving, as an output signal, the signals alternately reproduced by said video heads;

means for providing a reference pilot signal;

tracking signal generating means for generating a tracking error signal in response to tracking pilot signals included in said output signal and said reference pilot signal;

sampling signal generating means for generating a sampling signal in response to said head switching pulse; and gating means connected between said tracking signal generating means and said capstan drive means for selectively supplying said tracking error signal to said capstan drive means in response to said sampling signal.

2. A surveillance video tape recorder according to claim 1, wherein said tracking signal generating means includes multiplying means receiving said output signal and said reference pilot signal, a first series circuit of first bandpass filter means and first peak detector means, a second series circuit of second bandpass filter means and second peak detector means, and comparator means, said first and second series circuits being connected in parallel between said multiplying means and said comparator means and said tracking error signal being output from said comparator means.

3. A surveillance video tape recorder according to claim 1, wherein said gating means provides said tracking error signal to said capstan drive means at predetermined times in response to said sampling signal.

4. A surveillance video tape recorder according to claim 1, further comprising capstan speed error detecting means connected to said capstan motor and providing a speed error signal indicative of a speed error of said capstan motor.

5. A surveillance video tape recorder according to claim 4, wherein said capstan drive means includes adder means connected to receive outputs of said gating means and said capstan speed error detecting means, and an added output of said adder means is supplied to said capstan drive means as a composite error signal.

6. A surveillance video tape recorder according to claim 1, wherein said sampling signal generating means includes a first monostable multivibrator for receiving said head switching pulse and producing a delayed output, a second monostable multivibrator for receiving said delayed output and producing a further delayed output, and inverter means for inverting said further delayed output to produce said sampling signal.

7. A surveillance video tape recorder according to claim 6, wherein said first and second monostable multivibrators have predetermined delay times respectively substantially equal to one quarter and one half the time required for one revolution of said heads with said drum.

8. A surveillance video tape recorder according to claim 7, wherein said first and second monostable multivibrators have predetermined delay times of 8.3 ms and 16.7 ms, respectively.

9. A surveillance video tape recorder according to claim 1, wherein said multiplying means includes balanced modulator means.

10. A surveillance video tape recorder according to claim 1, wherein said means for providing a reference pilot signal includes reference pilot signal generating means which provides cyclically repeating reference pilot signals having different frequencies.

11. In a surveillance video tape recorder of the type including a guide drum about which said tape is wrapped at a predetermined angle with respect to a central axis of said drum and on which diametrically opposed first and second video heads are mounted at different heights in the direction of said central axis for alternately scanning across said tape to record information signals in successive slant tracks, said tape being at rest in a recording mode of said recorder during scanning by each of said video heads across said tape to record in a respective slant track and being moved a predetermined distance after each pair of scannings of said tape by said first and second video heads, respectively, said video heads further recording selected ones of a plurality of tracking pilot signals in respective ones of said tracks for identifying the same; a system for reproducing the recorded signals in a search mode of said recorder comprising:

capstan drive means including a capstan motor for driving said tape at a substantially constant speed in said search mode;

said first and second video heads scanning across said tape in said search mode along paths which, due to the driving of the tape at said substantially constant speed, each intercept a plurality of said slant tracks;

head switching pulse generating means connected to said rotary head means for generating a head switching pulse;

head switching means connected to said first and second video heads and responsive to said head switching pulse for deriving, as an output signal, the signals alternately reproduced by said video heads;

means for providing a reference pilot signal corresponding to a selected one of said plurality of tracking pilot signals;

tracking signal generating means for generating a tracking error signal in response to the tracking pilot signals included in said output signal and said reference pilot signal;

sampling signal generating means for generating a sampling signal in response to said head switching pulse; and gating means connected between said tracking signal generating means and said capstan drive means for selectively supplying said tracking error signal to said capstan drive means in response to said sampling signal so that each of said first and second video heads is aligned with a selected one of first and last portions of a slant track upon scanning along each said path across said tape, whereby a video image is provided with substantially hidden noise bars at the top and bottom thereof.

12. A surveillance video tape recorder according to claim 11, wherein said plurality of tracking pilot signals is constituted by first, second, third and fourth tracking pilot signals having respective different frequencies; and further comprising means operative in said recording mode for superimposing said first, second, third and fourth pilot signals on information signals so as to be recorded with the latter in a cyclically repeating sequence of said slant tracks, said first and third pilot signals being recorded in respective tracks by said first video head and said second and fourth pilot signals being recorded in respective tracks by said second video head.

13. A surveillance video tape recorder according to claim 12, wherein said sampling signal generating means includes delay means having a delay time equal to ¾ the time required for one revolution of said video heads, said delay means receiving said head switching pulse and producing a delayed output, and inverter means for inverting said delayed output to produce said sampling signal.

14. In a surveillance video tape recorder of the type including a guide drum about which said tape is wrapped at a predetermined angle with respect to a central axis of said drum and one which diametrically opposed first and second video heads are mounted at different heights in the direction of said central axis for alternately scanning across said tape to record information signals in successive slant tracks, said tape being at rest in a recording mode of said recorder during scanning by each of said video heads across said tape to record in a respective slant track and being moved a predetermined distance after each pair of scanning of said tape by said first and second video heads, respectively, said video heads further recording selected ones of a plurality of tracking pilot signals in respective ones of said tracks for identifying the same; a system for reproducing the recorded signals in a search mode of said recorder comprising:

capstan drive means including a capstan motor for driving said tape at a substantially constant speed in said search mode;

said first and second video heads scanning across said tape in said search mode along paths which, due to the driving of the tape at said substantially constant speed, are angled in respect to said slant tracks;

means connected to said first and second video heads for deriving, as an output signal, the signals alternately reproduced by said video heads;

means for providing a reference pilot signal corresponding to the one of said plurality of tracking pilot signals recorded in the slant track with which the video head then scanning the tape is to be aligned;

tracking signal generating means for generating a tracking error signal in response to the tracking pilot signals included in said output signal and said reference pilot signal and which indicates the deviation of said video head then scanning the tape from said track with which it is to be aligned; and means connected between said tracking signal generating means and said capstan drive means for selectively supplying to said capstan drive means the portions of said tracking error signal occurring during the movements of said video head along sections of the respective paths which are closest to said tracks with which such video heads are to be respectively aligned, said capstan drive means being responsive to said portions of the tracking error signal for aligning said first and second heads with the tracks to be scanned thereby at opposite end portions of said tracks so that said output signal corresponds to a video image with substantially hidden noise bars at the top and bottom thereof.

* * * * *